United States Patent [19]

Zaenglein et al.

[11] Patent Number: 4,989,699

[45] Date of Patent: Feb. 5, 1991

[54] PRELOADED COMPRESSION VALVE AND METHOD FOR A HYDRAULIC DAMPER

[75] Inventors: Daniel P. Zaenglein, Centerville; Joel R. Wells, Huber Heights; Thomas N. Tiller, Germantown, all of Ohio

[73] Assignee: General Motors Corporation, Detroit, Mich.

[21] Appl. No.: 473,568

[22] Filed: Feb. 1, 1990

[51] Int. Cl.⁵ ............................................. F16F 9/34
[52] U.S. Cl. .......................... 188/322.14; 29/890.124
[58] Field of Search ......... 29/890.09, 890.12, 890.124, 29/890.129; 188/282, 317, 318, 322.13, 322.14, 322.15

[56] References Cited

U.S. PATENT DOCUMENTS

| | | | |
|---|---|---|---|
| 3,187,847 | 6/1965 | Karlgaard. | |
| 3,621,949 | 11/1971 | Watson | 188/284 |
| 3,724,615 | 4/1973 | Stormer | 188/322 |
| 3,999,274 | 12/1976 | Butler | 29/243.54 |
| 4,356,898 | 11/1982 | Guzder et al. | 188/280 |
| 4,606,440 | 8/1986 | Buchanan, Jr. et al. | 188/319 |
| 4,747,475 | 5/1988 | Hagwood et al. | 188/322.15 |

FOREIGN PATENT DOCUMENTS

| | | | |
|---|---|---|---|
| 0140712 | 3/1949 | Australia | 188/322.14 |
| 900061 | 12/1953 | Fed. Rep. of Germany. | |

Primary Examiner—Duane A. Reger
Attorney, Agent, or Firm—A. Michael Tucker

[57] ABSTRACT

A compression valve assembly includes a valve cage having a stem at a first end and an annular skirt at a second end. The skirt is provided with a slidable surface. A relief valve is adapted for selectively blocking fluid flow through the valve cage. A cup includes an annular rim and a base. The rim is provided with a slidable surface. A spring biased agaist the relief valve is selectively compressed as the cup rim is slidably received over the skirt by a measured axial load provided by a preloading means. The cup is secured to the valve cage and the axial load is removed.

2 Claims, 1 Drawing Sheet

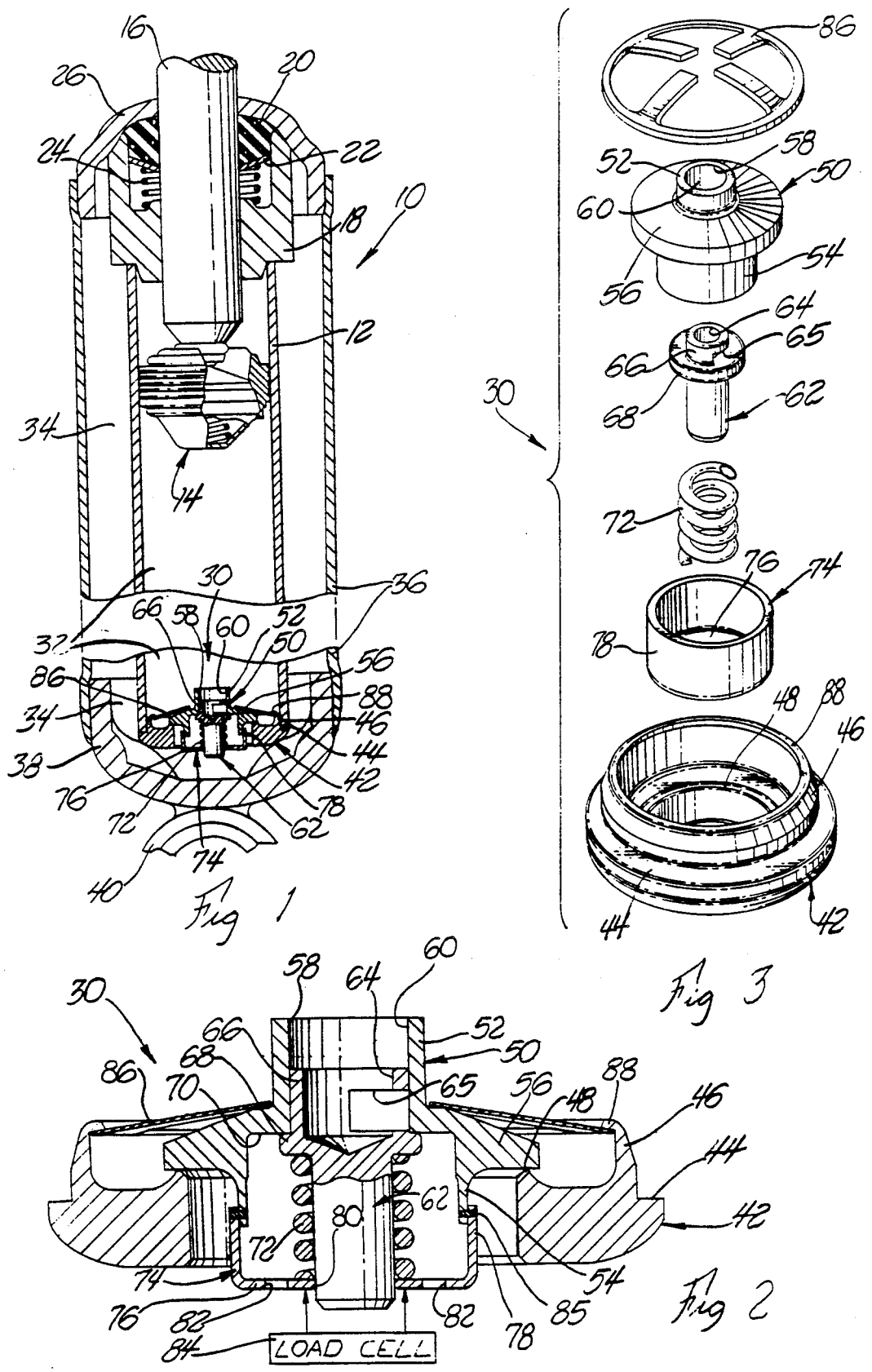

PRELOADED COMPRESSION VALVE AND METHOD FOR A HYDRAULIC DAMPER

BACKGROUND OF THE INVENTION

1. Field of the Invention

The present invention relates generally to fluid valving in a base assembly of a hydraulic damper. In particular, an assembly and method are disclosed which permit the selected compression and preloading of a spring in the compression valve assembly so that the valve opens in response to a predetermined fluid pressure in the damper.

2. Statement of the Related Art

Twin tube hydraulic shock absorbers and struts have compression valve assemblies with a well-known valve cage. The valve cage includes an annular skirt and a fluid passage. A relief valve is inserted inside of the skirt and blocks the flow of fluid through an orifice. A helical valve spring extends upwardly from a spring retainer to contact the relief valve so that it is operative to control fluid flow through the orifice. The spring retainer is received in a groove on the inner surface of the annular skirt.

Conventional assemblies are prepared by measuring the fixed height of the compression valve assembly. In other words, the groove provided in the annular skirt is designed for an optimal spring rate based on the height of the compressed spring. However, during a production run, part tolerances can vary, including the respective heights of the valve cage, relief valve and valve spring. When variances occur, the predetermined location of the groove may not provide the optimal compression of the valve spring. Consequently, the fluid flow through a compression valve assembly can vary, resulting in less than optimal operation of the damper.

The art continues to seek improvements. It is desirable to provide an economical compression valve assembly utilizing a spring to control fluid through a flow passage. Furthermore, it is desirable to preload each spring at substantially the same level in a production run to ensure uniformity of the valve operation.

SUMMARY OF THE INVENTION

The present invention is directed to a preloaded compression valve assembly and method for a hydraulic damper. An axial force is applied to a cup of the valve assembly to preload the spring to a selected level. A load cell can be utilized to measure the force applied so that each spring in a production run is preloaded to substantially the same level. The selective compression and preloading of the spring is maintained by an economical and efficient welding process.

In a preferred embodiment, the present compression valve assembly includes a valve cage having a stem at a first end and an annular skirt at a second end. The skirt is provided with a slidable surface. A relief valve is adapted for selectively blocking fluid flow through the valve cage. A cup includes an annular rim and a base. The rim is provided with a slidable surface. A spring biased against the relief valve is selectively compressed as the cup rim is slidably received over the skirt by a measured axial load provided by a preloading means. The cup is secured to the valve cage and the axial load is removed.

BRIEF DESCRIPTION OF THE DRAWINGS

FIG. 1 is a side view, partly in elevation and partly in cross-section, of a twin tube hydraulic damper utilizing a compression valve assembly according to this invention.

FIG. 2 is an enlarged sectional view of the compression valve assembly of FIG. 1.

FIG. 3 is an enlarged exploded perspective view of the compression valve assembly of FIGS. 1 and 2.

DETAILED DESCRIPTION OF THE PREFERRED EMBODIMENT

FIG. 1 illustrates a twin tube shock absorber indicated generally at 10 for damping the spring action of a vehicle suspension. The shock absorber 10 includes a fluid-filled inner cylinder 12 in which a valved piston assembly indicated generally at 14 is operatively mounted for linear stroking movement, thereby controlling the action of the vehicle suspension springs (not illustrated) during compression and rebound in a well-known manner. A piston rod 16 fastened at its inner end to the piston assembly 14 extends upwardly therefrom and through the inner cylinder 12, a piston rod guide 18, and elastomeric seal 20, a seal retainer 22, a helical seal spring 24 and a cap-like upper seal cover 26 into connection with an upper mount (not illustrated) for attachment to the sprung or unsprung mass of the vehicle (not illustrated).

The upper end of the cylinder 12 is closed by the piston rod guide 18 while the lower end has a base or compression valve assembly indicated generally at 30 operatively mounted therein that controls the flow of fluid between an inner cylinder chamber 32 beneath the piston assembly 14 and a reservoir 34 formed between a reservoir tube 36 that surrounds the inner cylinder 12. The reservoir tube 36 has its lower end welded to a base cup 38 and its upper end welded to the seal cover 26 to provide a fluid-tight outer jacket. The base cup 38 has a lower mount 40 for attachment to the unsprung or sprung mass of the vehicle.

The compression valve assembly 30 includes a cylinder end 42 having an annular step 44 at its outer periphery. The step 44 is press fitted to the lower end of the inner cylinder 12 in a well-known manner to form a fluid seal. An upper portion of the cylinder end 42 includes an annular flange 46. A low-velocity fluid orifice 48 is formed radially inwardly of the annular flange 46.

A valve cage indicated generally at 50 is a substantially cylindrical member having a stem 52 at one end and an annular skirt 54 at a second end. A retaining flange 56 is provided between the stem 52 and the skirt 54. A high-velocity orifice 58 and a fluid passage 60 are provided in the stem 52 to permit fluid flow as described below. Preferably, the skirt 54 includes a smooth outer surface.

A relief valve indicated generally at 62 is a substantially cylindrical member including an opening 64 and gate 65 at its upper end 66 and a stop flange 68 adjacent its central portion. The relief valve 62 is inserted inside the annular skirt 54 so that the stop flange 68 rests on a lower end 70 of the stem 52 and the upper end 66 is slidably received in the fluid passage 60 of the stem 52.

A helical or coil spring 72 is provided about the lower portion of relief valve 62. A first end of the spring rests against the lower surface of the stop flange 68 of the relief valve 62.

A cup indicated generally at 74 is a substantially hollow cylindrical member having a base portion 76 and an annular circumferential rim 78. The base portion 76 includes a central opening 80 for receiving the lower end of the relief valve 62. The rim 78 includes a smooth interior surface which is slidable with respect to the outer surface of the skirt 54 of the valve cage 50. A plurality of flow openings 82 is provided in the base portion 76 radially outwardly of the central opening 80.

An axial load is applied to a load cell 84 to engage the base 76 of the cup 74 with the lower end of the spring 72. The force to displace the cup 74 with respect to the valve cage 50 and to compress the spring 72 is measured so that a selected preload is provided in the spring 72. The spring preload can be selected depending upon the desired fluid flow characteristics of the compression valve assembly 30. After the rim 78 is selectively positioned by the load, the rim 78 is welded as indicated at 85 at arcuately spaced stations to the skirt 54 of the valve cage 50, and the load and load cell 84 are removed.

The subassembly comprising the valve cage 50, the relief valve 62, the preloaded spring 72, and the cup 74 is then mounted onto the cylinder end 42 and retained by the well-known intake valve spring 86. The lower surface of the flange 56 is mounted on the low-velocity orifice 48. The intake valve spring 86 is received inside the annular flange 46 of the cylinder end 42 and held in place as the annular flange 46 is crimped as indicated at 88 over onto the intake valve spring 86 in a well-known manner.

During the compression stroke of the shock absorber 10, the piston 14 is forced downwardly, thereby decreasing the volume in the inner cylinder chamber 32. The majority of fluid is forced through the high-velocity orifice 58 in the valve cage 50 to force the relief valve 62 downwardly against the spring 72 and permit the flow of fluid from the inner cylinder chamber 32 through the relief valve gate 65 to the reservoir 34 in a well-known manner. On the rebound stroke, fluid forces the valve cage 50 from its seat on the low-velocity orifice 48 and flows from the reservoir 34 through the compression valve assembly 30 into the inner cylinder chamber 32.

The present invention discloses an efficient and economical apparatus and method of assembling a compression valve assembly 30 for a damper. The spring force of the compression valve 30 can be preloaded to a selected level to provide the desired fluid flow characteristics.

Although the present invention has been described with reference to a preferred embodiment, workers skilled in the art will recognize that changes may be made in form and detail without departing from the spirit and scope of the invention. For example, the embodiment described and illustrated shows the inner surface of the rim 78 slidable against the outer surface of the skirt 54. If desired, the compression valve assembly 30 can be designed so that the outer surface of the rim 78 is slidable against the inner surface of the skirt 54.

The embodiments of the invention in which an exclusive property or privilege is claimed are defined as follows:

1. A compression valve assembly for use in a hydraulic damper comprising:
   (a) cage means having a stem at a first end and an annular skirt at a second end, the skirt including an exterior slidable surface;
   (b) fluid passage means provided in the cage means;
   (c) valve means for controlling fluid flow through the fluid passage means including
      (i) a valve element for blocking fluid flow, and
      (ii) selectively compressed spring means in contact at a first end with the valve element; and
   (d) cup means for retaining the selected compression of the spring means, the cup means including a base in contact with a second end of the spring means and an annular rim having an interior slidable surface slidably received over and welded to the exterior surface of the skirt.

2. A method of assembling fluid valving in a compression valve assembly of a hydraulic damper so that the valving permits fluid flow in response to a predetermined fluid pressure in the damper, the method comprising the steps of:
   (a) providing a cage means having fluid passage means and an annular skirt;
   (b) inserting a valve element inside the skirt for selectively blocking fluid flow through the fluid passage means;
   (c) placing the first end of a compressible spring onto the valve element;
   (d) placing a cup having a base and an annular rim onto a second end of the spring so that the base is in contact with a second end of the spring and the rim is in slidable contact with the skirt;
   (e) applying a measured axial load to the cup to selectively compress and preload the spring;
   (f) securing the rim in a fixed relationship to the skirt to maintain the selected compression of the spring.

* * * * *